United States Patent [19]

Vakhidov et al.

[11] Patent Number: 4,851,634
[45] Date of Patent: Jul. 25, 1989

[54] DEVICE FOR ELECTRICAL DISCHARGE PIERCING OF HOLES IN COMPONENTS

[76] Inventors: Khaidar A. Vakhidov, masssiv Chilanzar, 2 kvartal, 23, kv. 6; Erkin T. Abdukarimov, 52. kv. 6, both of Tashkent, U.S.S.R.

[21] Appl. No.: 236,770
[22] PCT Filed: Sep. 17, 1987
[86] PCT No.: PCT/SU87/00099
 § 371 Date: May 24, 1988
 § 102(e) Date: May 24, 1988
[87] PCT Pub. No.: WO88/02294
 PCT Pub. Date: Apr. 7, 1988

[30] Foreign Application Priority Data

Sep. 25, 1986 [SU] U.S.S.R. ............... 4119670

[51] Int. Cl.⁴ .................. B23H 1/00; B23H 9/14
[52] U.S. Cl. .................. 219/69.15; 219/69.2
[58] Field of Search ............ 219/69 E, 69 V, 69 W

[56] References Cited

U.S. PATENT DOCUMENTS

| 3,601,572 | 8/1971 | Check et al. | 219/69 E |
| 3,855,442 | 12/1974 | Check et al. | 219/69 E |
| 4,044,216 | 8/1977 | Check et al. | 219/69 E |
| 4,191,878 | 3/1980 | Check et al. | 219/69 E |
| 4,543,460 | 9/1985 | Inoue | 219/69 M |

FOREIGN PATENT DOCUMENTS 607691 4/1978 U.S.S.R. .
844191 7/1981 U.S.S.R. .

OTHER PUBLICATIONS

B. A. Artamonov et al., "Elektrofizicheski i Elektrokhimicheskie Metody Obrabotki Materialov", 1983.

Primary Examiner—A. D. Pellinen
Assistant Examiner—Geoffrey S. Evans

[57] ABSTRACT

A device for electrical discharge piercing of holes in components comprises a tool electrode mounted in an electrode holder (18) and made as a rod (26) enclosed, with a clearance, in a sheath (27) and somewhat projecting therefrom, and a contrivance for traversing, locking and wear compensation of the tool electrode. The aforesaid contrivance comprises a driving carriage (11) and a driven carriage (12), both being mechanically interlinked and set in parallel to each other, each of the carriages carrying a clamp adapted for alternately locking the rod (26) of the tool electrode, the clamp being made as a movable jaw (29,30) and a fixed jaw (45,46), while the housing of each carriage (11, 12) has through center-aligning holes situated at the level of the gap between the movable jaw (29,30) and the fixed jaw (45,46) and arranged coaxially with a channel (23) made in a union locked in place in the bottom portion of the electrode holder (18), the tool electrode rod (26) being axially traversable in the channel (23), the sheath of the tool electrode rod being fixed in place on the electrode holder union coaxially with the tool electrode rod, and the electrode holder is fixed in place on the driving carriage.

2 Claims, 5 Drawing Sheets

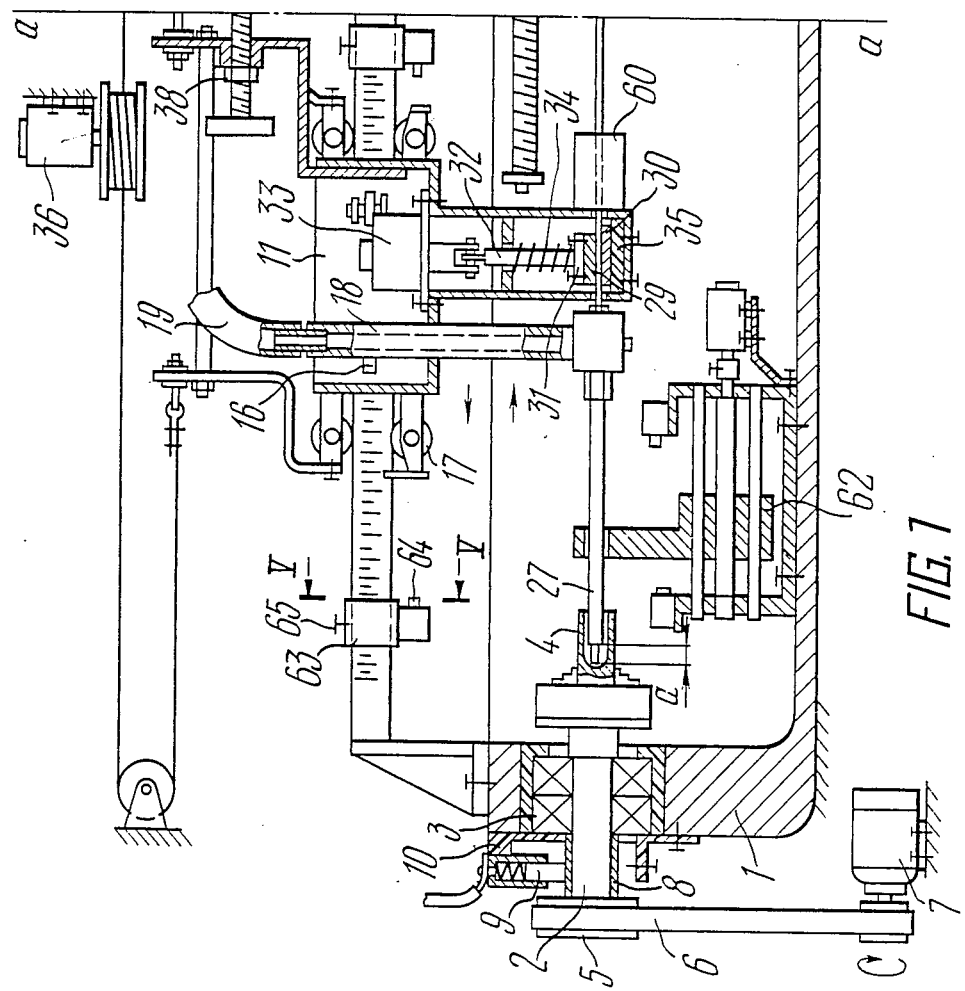

DEVICE FOR ELECTRICAL DISCHARGE PIERCING OF HOLES IN COMPONENTS

FIELD OF THE INVENTION

The present invention relates generally to electrical discharge machining of metals and more specifically, to a deivce for hole piercing in various components.

BACKGROUND ART

Known in the present state of the art is a device for electrical discharge piercing of holes by means of a tool electrode (U.S. Pat. No. 4,543,460). The known device comprises an electrode holder which is in fact a guide element through whose bore an electrode is passed with a possibility to traverse vertically lengthwise its longitudinal axis under the action of an electrode feed drive. The drive is powered from a numerical control device whose compound signals (pulses) control the amount of spark gap between the electrode working end and the workpiece, as well as the rate of the electrode feed depthwise the workpiece. Besides, the electrode feed drive responds to electric signals delivered from the spark gap so as to adjust the position of the electrode working end with respect to the workpiece and to maintain constant spark gap. The amount of the spark gap is to be maintained constant also with the purpose of compensating for spark-erosion wear on the electrode. The electrode feed drive may perform also an additional function, i.e., to rotate the electrode about its longitudinal axis and impart oscillating motion to the electrode lengthwise its longitudinal axis.

Electrical discharge machining medium or working fluid is supplied under pressure from the tank along a pipe to the bore of the guide element and further on into the spark gap. In addition, the device is provided with a block which effects control over disposal of the spark-erosion waste products from the working gap so that concentration of said waste products be maintained somewhat above the preset level, thus preventing formation of electric discharge pulses from destabilization and making for stable rate of electrode feed and the entire workpiece machining process.

The block is situated in close proximity to the workpiece surface with a small clearance between the electrode and the workpiece; it has a centre hole for the electrode to pass through, a clearance being left between the hole faces and the electrode. An annular recess is provided in the top portion of said block, adapted to receive the bottom portion of the cylinder-shaped guide element carrying the electrode, both the former and the latter being held together. The centre hole in the block communicates with the bore of the guide element, wherein the electrode top portion is accommodated. The bottom block portion arranged lengthwise the workpiece surface, establishes a uniform clearance wtih the workpiece surface. The block is vertically traversable from its own drive, which is also controlled by command signals delivered from a numerical control device so as to cause the block to alter its vertical position with the purpose of maintaining the amount of clearance between the block lower surface and the workpiece surface constant. The drive is also capable of responding to a change in the amount of working (spark) gap and hence in the machining conditions.

However, the aforementioned electrode construction featuring the feed drive and compensation for the consumable electrode portion in conjunction with a working liquid recirculation in the machining zone renders the known device unsuitable for piercing deep or long holes whose diameter would be comparable with the electrode diameter, since the process of electrical discharge hole piercing according to the adopted technique will be accompanied by a continuously increasing consumption of electric power supplied to the electrode, while a major part of electric power will be spent for side spark erosion arising between the face of the hole being pierced and the bare electrode throughout its whole length equal to the length of hole being machined. Moreover, no working liquid recirculation in the machining zone leads to constant clogging of the spark gap with the products of the spark erosion process. Eventually, the hole piercing process ceases when the depth of the hole being machined gets equal to about 8 or 10 electrode diameters.

SUMMARY OF THE INVENTION

The invention has for its object to provide a device for hole piercing in current-conducting materials, featuring such a structural design of a contrivance for near compensation of a tool electrode, which would make it possible to increase production rate and accuracy of machining long and extralong holes.

The aforesaid object is accompanied due to the fact that in a device for electrical discharge piercing of holes in components, comprising a tool electrode mounted in an electrode holder and shaped as a rod which is enclosed in a sheath with a clearance to the latter and somewhat projecting from said sheath, and a contrivance for traversing, locking and wear compensation of the tool electrode, according to the invention, the contrivance for traversing, locking and wear compensation of the tool electrode incorporates a driving carriage and a driven carriage, both being machanically interlinked and set in parallel to each other, each of said carriages carrying a clamp adapted for alternately locking the rod-shaped tool electrode in position, said clamp being made as a movable jaw and a fixed jaw, while the housing of each of the carriages has through centrealigning holes situated at the level of the gap between the movable and fixed clamp jaws and arranged coaxially with the channel in a pipe union fixed in place in the bottom portion of the electrode holder, the rod of the tool electrode being axially traversable in said channel, the sheath of the tool electrode being held fast on the electrode holder pipe union coaxially with the rodshaped electrode, whereas the electrode holder is fixed in place on the driving carriage.

It is expedient that the electrode holder be a hollow structure and that its interior space be in communication with the channel accommodating the rod-shaped electrode, thus providing for supply of the working fluid through the gap between the sheath andthe rod-shaped electrode to the zone of workpiece machining.

The herein-proposed invention is instrumental in piercing long and extra-long holes in any current-conducting materials, the holes produced featuring high precision and high quality of surface finish.

BRIEF DESCRIPTION OF THE DRAWINGS

In what follows the herein-proposed invention will be illustrated by way of some exemplary embodiments thereof to be read with reference to the accompanying drawings, wherein:

FIGS. 1 and 1a are a schematic view of a device for electrical discharge piercing of holes in current-conducting materials, according to the invention;

BEST MODE OF CARRYING OUT THE INVENTION

Figure 1A:
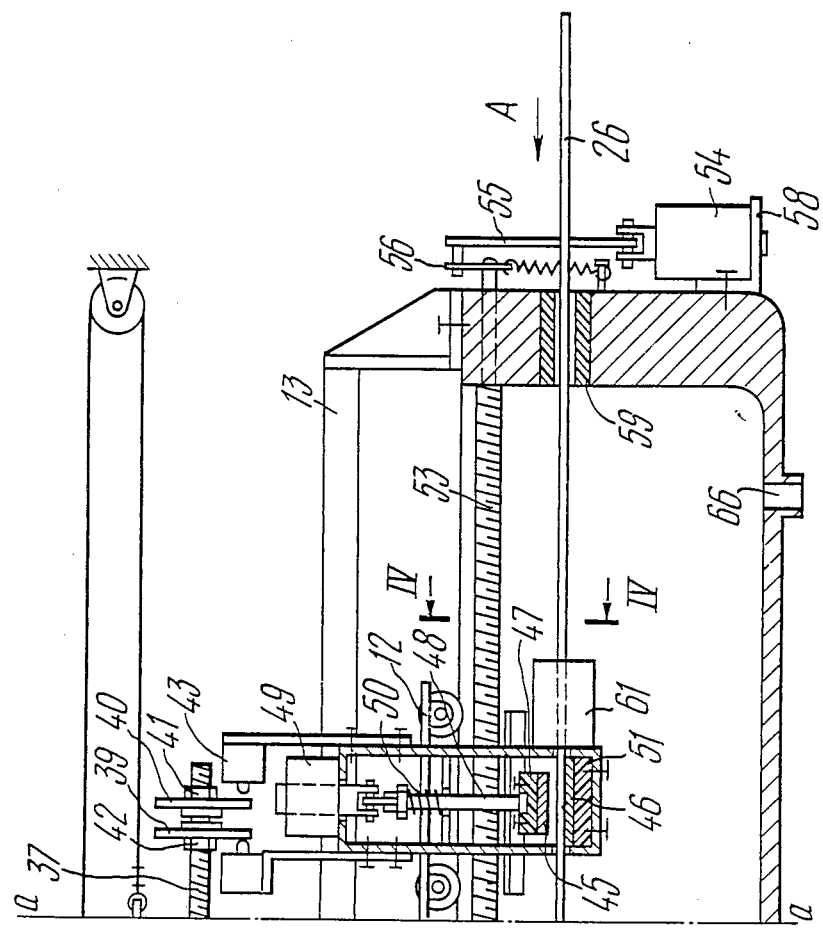

The device for electrical discharge piercing of holes, according to the invention, comprises a bath 1 (FIG. 1), a shaft 2 supported on bearings 3 being mounted in the wall of said bath, said shaft being adapted for a workpiece 4 to hold. The shaft 2 is connected to an electric motor 7 through a pulley 5 and a belt transmission 6 so as to transmit rotation to the workpiece 4. A spacer sleeve 8 is set on the extension of the shaft 2 protruding beyond the limits of the bath 1, said sleeve being interposed between the pulley 5 and the bearing 3 so as to be in contact with a spring-loaded brush 9 fixed on a covar 10 which is made from a dielectric and is situated on the outside wall of the bath 1. An electric potential is applied to the workpiece 4 through the brush 9, the spacer sleeve 8, and the shaft 2, said potential having a polarity opposite to the polarity of the tool electrode (which is positive in this particular case). The device incorporates also a contrivance for traversing, locking and wear compensation of the tool electrode, said contrivance being made as a driving carriage 11 and a driven carriage 12 mechanically interlinked and set in parallel to each other.

The driving carriage 11 is traversable on a guideway 13 set parallel to the axis of rotation of the shaft 2, with the aid of rollers, 14, 15, 16, (FIG. 2) and 17 (FIG. 1). A hollow electrode holder 18 is fixed in place on the housing of the driving carriage 11, working fluid being force-fed into the hollow electrode holder through a flexible pipe 19. A sleeve made integral with the electrode holder 18 is located in the bottom portion of the latter. A dielectric bush 20 (FIG. 3) is press-fitted into said sleeve, while a union 22 is accommodated in the dielectric bush 20 coaxially therewith and is held in place with a screw 21. A through channel 23 is made in the union 22 arranged lengthwise its longitudinal axis and coaxially with the axis of rotation of the shaft 2. A thrust nut 24 with a seal 25 is provided at one end of the union 22, and a rod 26 of the tool electrode is passed through the channel 23, the thrust nut 24 and the seal 25.

Figure 3:
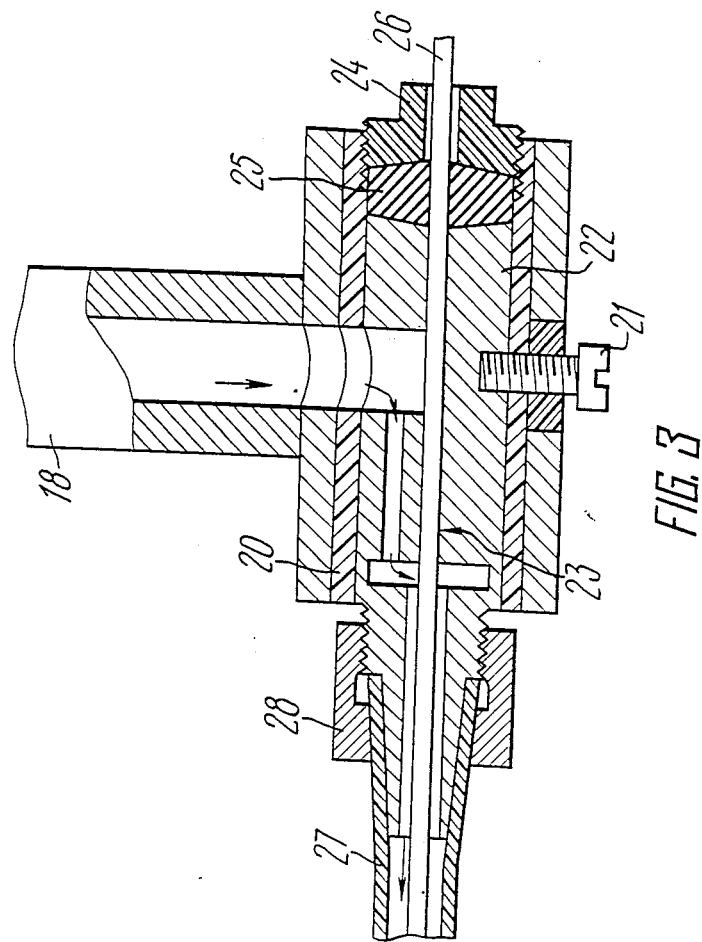
FIG. 3 is a longitudinal sectional view of the electrode holder.

A sheath 27 is clearance-fitted onto the rod 26 of the tool electrode and is held to the union 22 by a nut 28, so that the working end of the rod 26 of the tool electrode be extended from the sheath 27 (FIG. 1) for a certain preset length 'a'. A clamp of the tool electrode rod 26 is located on the housing of the driving carriage 11, said clamp being made as a movable jaw 29 and a fixed jaw 30. A tierod 32 of an electromagnetic drive 33 located on the driving carriage 11 is connected to the movable current-conducting jaw 29 through a dielectric plate 31. The movable current-conducting jaw 29 is electrically connected to the electric circuit of the power supply unit (omitted in the Drawing) and has an opposite polarity (which is negative in this particular case) with respect to the polarity of the workpiece 4. The movable jaw 29 snugly forces the tool electrode rod 26, by virtue of the tension of a spring 34, against the fixed jaw 30, thus reliably locking the tool electrode rod 26 in position. The fixed jaw 30 is held to a dielectric plate 35 which is fixed by screws on the housing of the driving carriage 11. A respective electric potential is supplied from the electric circuit of the power supply unit to the fixed current-conducting jaw 30 in the same way as to the movable jaw 29. The driving carriage 11 is associated, through a flexible link reeved through sheaves, with a drive 36 for traversing the driving carriage 11. The drive 36 is connected to the power supply and control unit from which control signals (commands) are delivered, which control the feed traverse of the tool electrode and its compensation. A screw 37 fixed with a locknut 38 is located on the housing of the driving carriage 11. Turned onto the extending end of the screw 37 are pusher nuts 39, 40 arrested with locknuts 41, 42. The pusher nuts 39, 40 are so positioned as to be between two limit switches 43, which are held to the brackets of the housing of the driven carriage 12. Thus, mechanical association is established between the driving carriage 11 and the driven carriage 12. The latter carriage is traversable on four rollers 44 which rest upon the edges of the both longitudinal walls of the bath 1, which edges serve as the guideways of the driven carriage 12. The guide edges of the longitudinal walls of the bath 1 are arranged parallel to the guideway 13. Another clamp of the tool electrode rod 26 is situated on the housing of the driven carriage 12, made as a movable jaw 45 and a fixed jaw 46. A tierod 48 of an electromagnetic drive 49 located on the housing of the driven carriage 12 is connected to the movable current-conducting jaw 45 through a dielectric plate 47. The movable jaw 45 is electrically connected to the electric circuit of the power supply unit (omitted in the Drawing) and has an opposite polarity (which is negative in this particular case) with respect to the polarity of the workpiece 4 (FIG. 1). The movable jaw 45 is forced out, by virtue of the tension of a spring 50, of the fixed jaw 46, which is set over a dielectric plate 51 made fast on the housing of the driven carriage 12 with two screws. A respective electric potential is supplied from the electric circuit of the power supply unit to the fixed current-conducting jaw 46 in the same way as to the movable jaw 45. The housings of the carriages 11 and 12 have each a through centre-aligning hole situated at the level of the gap between the movable and fixed clamp jaws and arranged coaxially with the channel 23 (FIG. 3).

Figure 4:
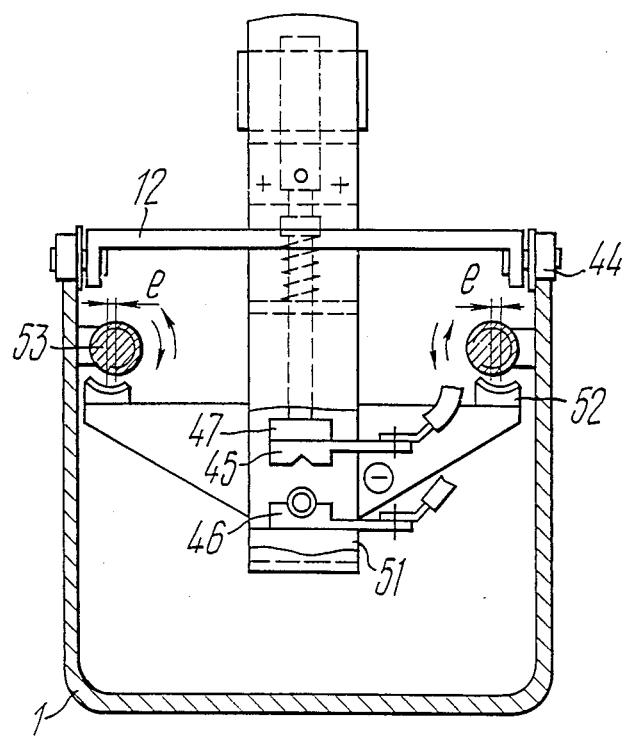
FIG. 4 is a cross sectional view of the bath tub of the device.

Secured on the housing of the driven carriage 12 are brackets carrying brake shoes 52 (FIG. 4), which are engageable with screws 53 arranged eccentrically with respect to the axis of their rotation (with an amount 'e' of eccentricity).

The screw 53 receives rotation from an electromagnetic drive 54 (FIG. 2) held to the tub of the bath 1. The drive 54 actuates the screw 53 through a link 55 and a bell-crank 56. A spring 57 made fast, with one of its ends on the bell-crank 56 and with the other end, on the rub of the bath 1, serves to return the screw 53 to the initial position. The electromagnetic drive 54 is mounted on a bracket 58 held to the tub of the bath 1 by screws. To provide electric insulation of the tool electrode rod 26 (FIG. 1) whose end extends beyond the bath 1, from the tub of said bath, the rod 26 is accommodated in a dielectric bush 59 press-fitted in the wall of the bath 1.

Figure 5:
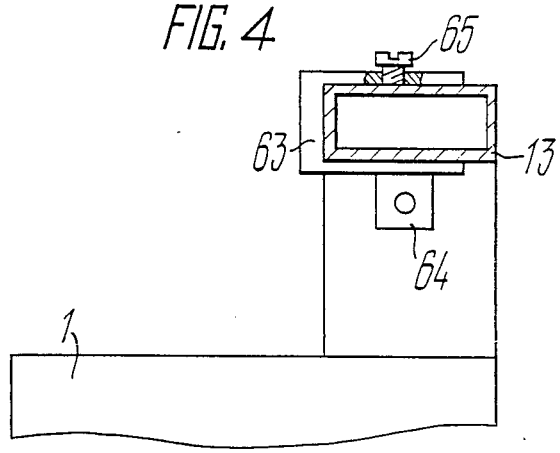
FIG. 5 is a sectional view of the carriage guideway.

Whenever it becomes necessary the construction of the device being disclosed herein may provide rotation of the tool electrode rod 26 which extends the processing capabilities of the device. This is attained due to the provision of attachments 60, 61 which are held to the driving carriage 11 and to the driven carriage 12, respectively. Located at the bottom of the bath tub is a feeder for a traversable rest 62, which serves for precision centre-aligning of the tool electrode in the course of electrical discharge piercing of a hole in the workpiece 4. The rest 62 is traversable along the axis of rotation of the shaft 2 from a special drive. Limit switches 64 (FIG. 5) are secured on the guideways 13 through special clamps 63, said switches being longitudinally traversable along the guideways 13 and fixable in a selected position with the aid of a stop screw 65. A drain port 66 is provided in the bottom of the bath 1 (FIG. 1) to discharge the working liquid therefrom.

The device for electrical discharge piercing of holes operates as follows.

The workpiece 4 (FIG. 1) to be machined is clamped in, e.g., a chuck and set on the shaft 2. Depending on the amount of the workpiece portion extending from the chuck and on the length of hole to be pierced, there is selected the initial position of the driving carriage 11 and the driven carriage 12, as well as of the rest 62. Accordingly, there is selected the position of the limit switch 64 which restricts the travel of the driving carriage 11 and the driven carriage 12 in their leftmost position. A drive 36 is provided to actuate the carriages 11 and 12 to assume their initial position. The rest 62 is set to the initial position by engaging its special drive. The tool electrode rod 26 preselected so as to suit the length of the hole to be pierced, is drawn through the dielectric bush 59, the through centre-aligning hole and further on through the opened jaws 45, 46 of the clamp for the tool electrode rod 26 on the driven carriage 12. Next in order to pass the tool electrode rod 26 between the jaws 29, 30 of the clamp on the driving carriage 11, the electromagnetic drive 33 is engaged by means of a special switch (omitted in the Drawing). Once the drive 33 has caused the movable jaw 29 to lift, the tool electrode rod 26 is drawn through the thus-established gap between the jaws 29 and 30. Then the rod 26 is passed through the centering joles and gets into the channel 23 (FIG.3) of the union 22, whereupon it is brought outside the latter for a required length. Thereupon the sheath 27 preselected so as to suit the size of the hole to be pierced is fitted over the portion of the tool electrode rod 26 extending beyond the union 22 and is locked on the latter by a nut 28. The inside diameter of the sheath 27 should be so selected as to provide a required gap between the tool electrode rod 26 and the inner suraces of the sheath 27. Once the sheath 27 has been secured on the electrode holder 18, whenever necessary, the tool electrode rod 26 is displaced in order to provide the amount of a preset extension 'a' of its working end (FIG. 1) from the sheath 27. This done, the electromagnetic drive 33 of the driving carriage 11 is disengaged, with the result that the movable jaw 29 actuated by the spring 34, forces the tool electrode rod 26 against the fixed jaw 30 of the tool electrode clamp, thereby fixing the tool electrode rod 26 in a required position on the driving carriage 11. Then the driving carriage 11 is made to traverse in order to fit the end of the tool electrode rod 26 into the centre-aligning hole of the rest 62. Next the electric motor 7 is started to impart rotation, via the belt transmission 6, to the pulley 5 and hence to the shaft 2 carrying the workpiece 4. The working liquid is pressure-fed through the flexible pipe 19 into the interior space of the electrode holder 18, when the working liquid is passed through a special port and a plug of the union 22 into the channel 23 and further on to the gap between the tool electrode rod 26 and the inner surface of the sheath 27. Thereupon the working liquid flows beyond the sheath 27 of the tool electrode to pass over the working end of the tool electrode rod 26 extending from the sheath 27.

Having made sure that the working liquid is fed properly to the zone of machining the workpiece 4 one should engage the power supply and control unit (omitted in the Drawing), with the result that a voltage is applied to the workpiece 4 through the brush 9, and to the tool electrode rod 26 through the jaws 29, 30 of the clamp for the tool electrode jaw 26 of the driving carriage 11. Concurrently the driving carriage 11 along with the tool electrode is actuated by the feed drive 36 to move towards the workpiece 4. As soon as the spark (electrode) gap (that is, the gap between the working end of the tool electrode rod 26 and the surface of the workpiece 4) reaches a required amount, a spark discharges between the tool electrode and the workpiece 4, which is indicative of a beginning of the electrical discharge process. Simultaneously with the tool electrode traverse the rest 62 is moved from its special drive.

While advancing the driving carriage 11 rests, through the pusher nut 39, against the limit switch 43 and starts pulling the driven carriage 12 behind. Having undone the locknut 38, one can alter the spacing between the carriages 11 and 12 by turning the screw 37 in or out so as to suit the diameter of the tool electrode rod 26. In a certain span of time within which the process of electrical discharge piercing of a hole occurs, necessity arises for restoring a preset length 'a' of overhang of the working end of the rod 26 from the sheath 27 of the tool electrode, since the projecting portion of the tool electrode rod 26 becomes wornout, i.e., the consumable portion of the tool electrode is to be compensated for. The process of compensation occurs in the following sequence. A control signal is delivered from the power supply and control unit for the drive 36 to disengage and hence to stop traversing of the driving carriage 12. Then the electromagnetic drives 33 and 49 come into action so that the tierod 48, while overcoming the force of the spring 50, presses the movable jaw 45 against the tool electrode rod 26, thus locking it in the clamp of the driven carriage 12. At the same time the bell-cranks 56 are actuated to turn, by the energized electromagnetic drive 54 (FIG. 2) through the link 55, and while overcoming the tension of the spring 57, they rotate the screws 53 (FIG. 4) which get engaged, by virtue of the eccentricity 'e', with the brake shoes 52 provided with a screw thread. Thus, the driven carriage 12 is locked in place with respect to the bath 1. Then the tierod 32 rises while overcoming the tension of the spring 34, thus opening the jaws 29, 30 of the clamp of the driving carriage 12, whereby the tool electrode rod 26 is released from locking in position.

Thereupon the drive 36 comes into action to impart backward motion to the driving carriage 11 along with the tool electrode sheath 27, i.e., in the direction opposite to that of the tool electrode feed traverse. The driving carriage 11 will perform backward motion until the pusher nut 40 rests against the limit switch 43, while the tool electrode sheath 27 is displaced backward with respect to the immovable tool electrode rod 26, since at a given instant of time the latter is locked in place on the arrested driven carriage 12. As a result, the overhung length of tool electrode rod 26 extending from the sheath 27 is increased, thus compensating for the consumed amount of the rod end projecting from the sheath 27. In this case the electrical discharge machining process proceeds incessantly. The length of the compensated-for consumable portion of the tool electrode is selected by appropriately adjusting the gap between the pusher nuts 39, 40 on the screw 37 and the limit switches 43. As soon as the limit switch 43 is acted upon by the pusher nut 40 the drive 36 is disengaged, i.e., the backward motion of the driving carriage 11 ceases, and the driving carriage 11 along with the tool electrode sheath 27 stops.

Just after this the electromagnetic drive 33 is deenergized and the movable jaw 29 of the clamp of the driving carriage 11 is actuated by the spring 34 to move down, and the tool electrode rod 26 happens to be tightly gripped between the jaws 29 and 30.

Then the electromagnetic drive 49 is engaged, and the movable jaw 45 of the clamp of the driven carriage 12 moves up, thus releasing the tool electrode rod 26 from locking in position.

The feed drive 36 of the driving carriage 11 is engaged and the carriage 11 starts traversing along with the tool electrode towards the workpiece 4 at a rate of working feed of the electrical discharge machining process.

Figure 2:
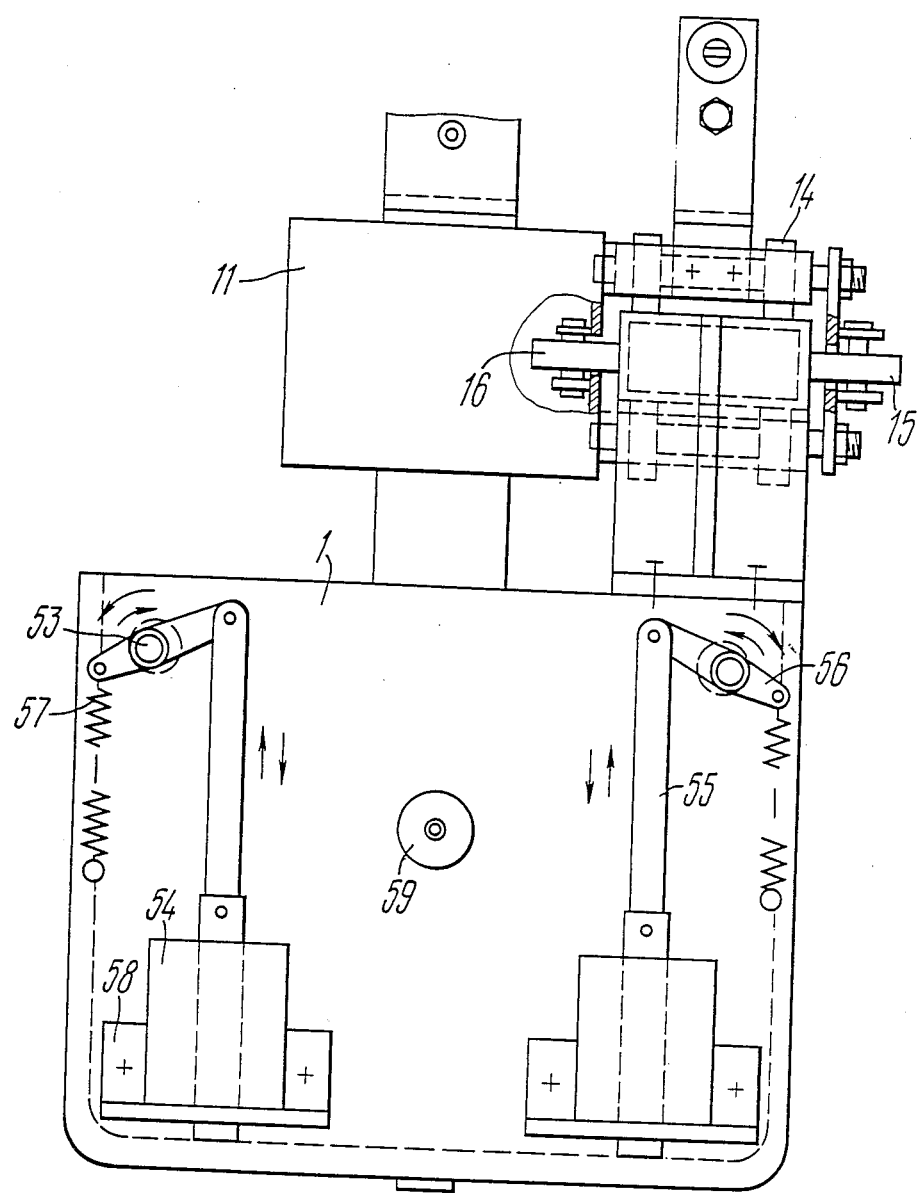
FIG. 2 is a view of the drive of a mechanism of the arresting contrivance of the stop.

As soon as the pusher nut 39 rests against the limit switch 43 located in the left-handportion of the driven carriage 12, the limit switch operates to deenergize the electromagnetic drive 54 (FIG. 2). The screws 33 (FIG. 1) are returned to the initial position under the action of the spring 57 and of the bell-crank 56 and are disengaged from the brake shoes 52 (FIG. 2). The driven carriage 12 becomes unlocked and starts advancing in the wake of the driving carriage 11. Thus, the electrical discharge machining process continues. The entire procedure described above is repeated as frequently as required.

Once the preset depth (length) of hole in the workpiece 4 has been attained, the driving carriage 11 rests against the limit switch 64 (on the side of the workpiece being machined) and, after the limit switch has come into action, the traverse drive 36 of the driving carriage 11 is disengaged, and the carriage 11 stops. The tool electrode and the workpiece 4 are deenergized, while the drive 36 and the special drive of the rest 62 are engaged, whereupon both of the carriages 11 and 12 and the rest 62 are rapidly returned to the initial position until they rest against the limit switches 64 and stop.

Whenever use is made of a tool electrode with the rotatable rod 26, the shaft 2 carrying the workpiece 4 is arrested with a stop screw. The clamps of the both carriages 11 and 12 are completely disconnected from the power supply and control unit, whereupon the attachments 60 and 61 are connected to the power supply and control unit instead. The attachment 60 incorporates a rotation drive of the tool electrode rod 26 and a clamp of the tool electrode rod 26 with a current lead to the rotatable tool electrode rod 26. The attachment 61 incorporates a rotary clamp of the tool electrode rod 26 with a current lead to the tool electrode rod 26.

The aforementioned embodiment of the device operates in quite the same way as in the case of the nonrotatably tool electrode rod 26 with the exception that the rotation drive of the shaft 2 is inoperative. The electrical discharge machining process proceeds incessantly in this case as well at the instant when the tool electrode is compensated for wear.

The present invention provides for machining of long and extralong holes in any current-conducting materials having a diameter of from 0.5 to 3 mm with high precision and quality of surface finish of the hole faces. This is favoured by the provision of a contrivance for wear compensation of the consumable portion of the tool electrode rod, whereby the overhang length of the consumable portion of the tool electrode rod extending from the sheath, is maintained constant in the course of the electrical discharge hole piercing, while the latter proceeds uninterruptedly at the instant when the consumable portion of the tool electrode rod is being compensated for.

The device is conveniently insertable in an automatic control system of the electrical discharge hole piercing process, which ensures high precision of machining and high quality of surface finish, safety in attending to the device, and does not require high skill from the attending personnel.

Industrial Applicability

The device for electrical discharge piercing of long and extralong holes in any current-conducting materials can find extensive application in the mechanical engineering and machine-tool building industries, as well as in the metal machining practice.

What is claimed is:

1. A device for electrical discharge piercing of holes in components, comprising a tool electrode mounted in an electrode holder (18) and shaped as a rod (26) enclosed, with a clearance, in a sheath (27) and somewhat projecting therefrom, and a contrivance for traversing, locking and wear compensation of the tool electrode, characterized in that the contrivance for traversing, locking and wear compensation of the tool electrode incorporates a driving carriage (11) and a driven carriage 12, which are mechanically interlinked and set in parallel to each other, each of the carriages carrying a clamp adapted for alternately locking the rod (26) of the tool electrode in position, the clamps being made as a movable jaw (29,30) and a fixed jaw (45,46), while the housing of each of the driving and driven carriages (11,12) has through centre-aligning holes situated at the level of the gap between the movable jaw (29,30) and the fixed jaw (45,46) and arranged coaxially with a channel (23) made in a union (22) fixed in place in the bottom portion of the electrode holder (18), the rod (26) of the tool electrode being axially traversable in the channel (23), the sheath (27) of the tool electrode being fixed in position on the union (22) of the electrode holder (18) coaxially with the rod (26) of the tool electrode, whereas the electrode holder (18) is fixed in place on the driving carriage (11).

2. A device is as claimed in claim 1, characterized in that the electrode holder (18) is a hollow structure and the interior space thereof is in communication with the channel (23) which accommodates the rod (26), thus providing for supply of the working fluid through the gap between the sheath (27) and the rod (26) to the zone of machining of the workpiece (4).

* * * * *